UNITED STATES PATENT OFFICE.

HAROLD R. MURDOCK, OF NAUGATUCK, CONNECTICUT, ASSIGNOR TO RUBBER REGENERATING COMPANY, A CORPORATION OF INDIANA.

RECLAIMING RUBBER-WASTE.

1,189,721.  Specification of Letters Patent.  Patented July 4, 1916.

No Drawing.  Application filed April 6, 1916.  Serial No. 89,329.

*To all whom it may concern:*

Be it known that I, HAROLD R. MURDOCK, a citizen of the United States, residing at Naugatuck, county of New Haven, and State of Connecticut, have invented certain new and useful Improvements in Reclaiming Rubber-Waste, of which the following is a full, clear, and exact description.

This invention relates to processes for reclaiming rubber waste and is more particularly directed to the reclaiming of waste containing lead and sulfur intended for use in the production of white or light colored goods.

In the manufacture of many kinds of rubber articles it is common practice in order to hasten the vulcanization of the rubber to add litharge or some other suitable compound of lead. The articles produced by such treatment ordinarily have a black color and if scrapped and reclaimed the lead sulfid remains as such lending its dark color to the reclaimed product; or if broken up by the action of acids, alkalis, or other means heretofore practised, remains as a soluble reactive substance which readily forms lead sulfid when the scrap is incorporated with other rubber and again cured. Such reformation of lead sulfid renders the scrap practically valueless for incorporation in white goods.

It is accordingly the object of my invention to provide a simple process for changing the dark colored waste into a light colored product and for preventing the reformation of lead sulfid or other material, giving the reclaimed product a dark appearance. Briefly stated I have found that this object may be accomplished by adding to the waste, zinc sulfate or any soluble salt capable of reacting with the sulfid of lead to form light colored water insoluble compounds.

In carrying out the preferred process embodying my invention the rubber waste or scrap containing lead sulfid is thoroughly washed by any of the well known washing methods and is simultaneously or later reduced to a comminuted state. Such washing removes water-soluble salts, sugars, etc., which in themselves have a slight darkening action on the scrap. The washed scrap is then dried sufficiently to permit the intimate mixing of the zinc sulfate or other salt therewith, of which about 10% by weight of the scrap is added. The zinc sulfate and scrap are then thoroughly mixed in a grinding mill or other apparatus adapted for the incorporation of filler materials with rubber. To the mixture thus prepared approximately 10% by weight of water is added. Two to ten per cent. by weight of anilin is then added and the product is heated in an open steam devulcanizer or other devulcanizing apparatus for preferably twenty hours at a steam pressure of approximately one hundred pounds. The quantity of water and anilin employed will vary with the kind of scrap used, and in some instances the addition of these substances may be omitted.

The reaction which takes place in carrying out the process as outlined results in the production of lead sulfate and zinc sulfid, both of which are insoluble in water and are of a light color. The reaction generally may be indicated as follows:

$$PbS + MA = MS + PbA$$

in which M represents the metal of the salt and A the acid radical of the salt. The zinc sulfate, of course, may be replaced by numerous other salts capable of producing water-insoluble light colored products with the lead and sulfur. Some of these substances are zinc chlorid, oxychlorids of arsenic and antimony, chlorids or sulfates of arsenic, antimony, cadmium and tin. On the other hand the process may be carried out with a combination of metallic salts of organic substances with certain other organic compounds where the products of the reaction are water insoluble and light colored and not detrimental to the rubber itself. For instance, a mixture of anilin sulfate and zinc oleate may be employed, the reagents probably first reacting to form zinc sulfate which operates as the lead sulfid destroying agent.

Concerning the use of anilin in connection with zinc sulfate it has been observed that those oils which are present during the devulcanization as neutral or alkali oils are better suited to the process than those forming organic acids during the devulcanization. Anilin has been found to be especially suitable and unites with the salt to produce a good white reclaimed rubber even when as small a quantity as one per cent. is used.

The product formed by the process above outlined has been found to possess excellent characteristics and may be used as such in the production of white goods. It does not darken upon subsequent curing.

As many apparently widely different embodiments of this invention could be made without departing from the spirit thereof, it is to be understood that I do not intend to limit myself to the specific form of the invention as set forth except as indicated in the appended claims.

Having thus described my invention what I claim as new and desire to protect by Letters Patent is:

1. The process of reclaiming rubber waste containing lead and sulfur, which comprises adding to the waste material a reactive material adapted to produce a light-colored water-insoluble compound with lead and converting the lead into said compound through the action of said reactive material.

2. The process of reclaiming rubber waste containing lead and sulfur, which comprises adding a reactive substance to the waste adapted to produce light-colored water-insoluble compounds with the lead and sulfur and converting the lead and sulfur into said compounds through the action of said reactive substance.

3. The process of reclaiming rubber waste containing lead and sulfur, which comprises adding to the waste material a substance having an acid radical adapted to form a light-colored water-insoluble salt with lead and converting the lead into said salt through the action of said acid radical.

4. The process of reclaiming rubber waste containing lead and sulfur, which comprises adding to the waste material a reactive substance comprising a metal and an acid radical adapted to form with the sulfur and lead respectively a light-colored water-insoluble sulfid and a light-colored water-insoluble lead salt, and converting the lead sulfid into said light-colored sulfid and lead salt through the action of said reactive substance.

5. The process of reclaiming rubber waste containing lead sulfid, which comprises adding to the waste material zinc sulfate and converting the lead sulfid through its reaction with the zinc sulfate into lead sulfate and zinc sulfid.

6. The process of reclaiming rubber waste containing lead and sulfur, which comprises forming a mixture with the waste of a water-soluble reactive substance adapted to produce with the lead a light colored water-insoluble compound, adding water to the mixture, heating the mixture and added water, and converting the lead into said compound through the action of said reactive substance.

7. The process of reclaiming rubber waste containing lead sulfid, which comprises forming a mixture with the waste of a water-insoluble substance made up of a metal and an acid radical forming with sulfur and lead respectively, a light-colored water-insoluble sulfid and a light-colored water-insoluble lead salt, adding water to the mixture, heating the mixture and added water, and converting the lead sulfid into said light-colored sulfid and lead salt through the action of said reactive substance.

8. The process of reclaiming rubber waste containing lead sulfid, which comprises forming a mixture with the waste of a water-soluble reactive substance adapted to produce with the lead sulfid light-colored water-insoluble products, adding water and a non-acid forming oil to the mixture, heating the mixture and added material, and converting the lead and sulfur into said water-insoluble light-colored compounds.

Signed at Naugatuck, Conn., this 29th day of March 1916.

HAROLD R. MURDOCK.

Witnesses:
 EDWARD A. ANDERSEN,
 A. R. BOARDMAN.